US011206537B2

(12) United States Patent
Ma et al.

(10) Patent No.: US 11,206,537 B2
(45) Date of Patent: Dec. 21, 2021

(54) SESSION ACTIVATION METHOD, APPARATUS, AND SYSTEM

(71) Applicant: HUAWEI TECHNOLOGIES CO., LTD., Guangdong (CN)

(72) Inventors: Jingwang Ma, Shanghai (CN); Lin Shu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 16/447,551

(22) Filed: Jun. 20, 2019

(65) Prior Publication Data

US 2019/0306758 A1    Oct. 3, 2019

Related U.S. Application Data

(63) Continuation of application No. PCT/CN2016/111753, filed on Dec. 23, 2016.

(51) Int. Cl.
*H04W 12/062* (2021.01)
*H04W 36/00* (2009.01)
(Continued)

(52) U.S. Cl.
CPC ...... *H04W 12/062* (2021.01); *H04W 36/0011* (2013.01); *H04W 36/08* (2013.01); *H04W 72/12* (2013.01)

(58) Field of Classification Search
CPC ..... H04W 80/10; H04W 76/11; H04W 76/12; H04W 76/10; H04W 8/08; H04W 48/18;
(Continued)

(56) References Cited

U.S. PATENT DOCUMENTS 9,203,549 B2    12/2015    Holness et al.
2013/0103492 A1  4/2013    Storm
(Continued)

FOREIGN PATENT DOCUMENTS

CN    101242645 A    8/2008
CN    102123487 A    7/2011
(Continued)

OTHER PUBLICATIONS

3GPP TR 23.799 V14.0.0 (Dec. 2016), "3rd Generation Partnership Project; Technical Specification Group Services and System Aspects; Study on Architecture for Next Generation System (Release 14)," Dec. 2016, total 528 pages.
(Continued)

*Primary Examiner* — Asad M Nawaz
*Assistant Examiner* — Najeeb Ansari
(74) *Attorney, Agent, or Firm* — Fish & Richardson P.C.

(57) ABSTRACT

Embodiments of the present disclosure provide a session activation method, a mobility management function entity, a session management function entity, a terminal, and a system. The method includes: obtaining, by a mobility management function entity, a protocol data unit (PDU) session activation request of a terminal, where the PDU session activation request includes an identifier of a PDU session and an identifier of the terminal, and the PDU session activation request is used to request activation of the PDU session; sending, by the mobility management function entity, the PDU session activation request to a session management function entity; and activating, by the session management function entity, the PDU session based on the PDU session activation request.

20 Claims, 9 Drawing Sheets

(51) Int. Cl.
*H04W 36/08* (2009.01)
*H04W 72/12* (2009.01)

(58) Field of Classification Search
CPC . H04W 76/30; H04W 76/20; H04W 36/0011; H04W 8/02; H04W 76/19
See application file for complete search history.

(56) References Cited

U.S. PATENT DOCUMENTS

| | | | |
|---|---|---|---|
| 2014/0105184 | A1 | 4/2014 | Lin et al. |
| 2016/0242216 | A1 | 8/2016 | Zhao et al. |
| 2018/0097894 | A1* | 4/2018 | Li .................... H04W 4/021 |
| 2018/0098251 | A1* | 4/2018 | Li .................... H04W 36/0016 |
| 2018/0376445 | A1* | 12/2018 | Yoon ................. H04W 76/30 |
| 2019/0037636 | A1* | 1/2019 | Kim .................. H04W 60/00 |
| 2019/0182788 | A1* | 6/2019 | Lee ................... H04W 60/00 |
| 2020/0059989 | A1* | 2/2020 | Velev ................ H04W 36/12 |
| 2020/0187277 | A1* | 6/2020 | Lee ................... H04W 80/10 |
| 2020/0267753 | A1* | 8/2020 | Adjakple ........... H04W 72/14 |

FOREIGN PATENT DOCUMENTS

| | | |
|---|---|---|
| CN | 102428736 A | 4/2012 |
| CN | 102625285 A | 8/2012 |
| CN | 104469691 A | 3/2015 |
| CN | 105813079 A | 7/2016 |

OTHER PUBLICATIONS

Extended European Search Report issued in European Application No. 16924589.1 dated Nov. 6, 2019, 9 pages.
S2-166742—Samsung, "NG2-based Handover procedure," SA WG2 Meeting #118, Reno, U.S.A., Nov. 14-18, 2016, 6 pages.
S2-167162—Nokia et al., "Interim agreement on Routing of NAS signalling and on How the AMF can select the proper SMF instance for a PDU session," SA WG2 Meeting #118, Reno, U.S.A., Nov. 14-18, 2016, 5 pages.
Office Action issued in Chinese Application No. 201680091560.X dated Jan. 21, 2020, 23 pages (With English Translation).
NEC, "Session management per PDU session" S2-164567 SA WG2 Meeting #116bis, China, Sanya, Aug. 29-Sep. 3, 2016, 5 pages.
PCT International Search Report and Written Opinion in International Application No. PCT/CN2016/111,753, dated Aug. 30, 2017, 19 pages (With English translation).
3GPP TS 23.401 V13.9.0 (2016-12), "3rd Generation Partnership Project; Technical Specification Group Services and System Aspects; General Packet Radio Service (GPRS) enhancements for Evolved Universal Terrestrial Radio Access Network (EUTRAN) access (Release 13)," Dec. 2016, 374 pages.
EPO Summons to Attend Oral Proceedings pursuant to Rule 115(1) EPC issued in European Application No. 16924589.1 dated Aug. 16, 2021, 7 pages.

* cited by examiner

SESSION ACTIVATION METHOD, APPARATUS, AND SYSTEM

CROSS-REFERENCE TO RELATED APPLICATIONS

This application is a continuation of International Application No. PCT/CN2016/111753, filed on Dec. 23, 2016, the disclosure of which is hereby incorporated by reference in its entirety.

TECHNICAL FIELD

Embodiments of the present invention relate to the field of communications technologies, and in particular, to a session activation method, an apparatus, and a system.

BACKGROUND

Currently, an evolved packet core (EPC) uses an architecture that is based on a network element (NE). A typical NE includes a mobility management entity (MME), a serving gateway (Serving Gateway, S-GW), a packet data network gateway (P-GW), and the like. However, with expansion of business models and development of technologies, a service requirement of a user changes. A network function (NF) provided by the EPC is built into and distributed on NEs. When a new NF needs to be introduced to support a requirement of the user, the EPC needs to redefine and redesign processing logic and procedure interaction of the NEs. For an equipment vendor, such a redesign manner has a long development cycle and high costs; and for a network operator, such a redesign manner makes the network operator fail to publish a new network service in time.

In this case, an NE (for example, an MME or an S-GW) in a core network architecture is split into different NF components based on function types (for example, an authentication and security function, a session management function, a mobility management function, and an access control function), and different functions are implemented by using corresponding NF components. Different NF components are functionally decoupled. An NF component may interact with another NF component through an interface supported by the NF component, to implement a related network service.

In practice, for the NE in the core network architecture, a mobility management (MM) function and a session management (SM) function may be separated, where the MM function is implemented by using an MM function entity, and the SM function is implemented by using an SM function entity. However, after the MM function and the SM function are separated, a plurality of protocol data unit (PDU) sessions may be set up for a terminal, and these PDU sessions may be concurrently activated. This makes signaling interaction between the terminal and a network frequent, causing relatively high network load and relatively quick power consumption of the terminal.

SUMMARY

To resolve the foregoing problem, embodiments of the present invention provide a session activation method, a mobility management function entity, a session management function entity, a terminal, and a system, to mitigate excessive signaling interaction between a terminal and a network in an existing solution.

According to one aspect, an embodiment of the present invention provides a session activation method, where the method includes: obtaining, by a mobility management function entity, a protocol data unit PDU session activation request of a terminal, where the PDU session activation request includes an identifier of a PDU session and an identifier of the terminal, and the PDU session activation request is used to request activation of the PDU session; sending, by the mobility management function entity, the PDU session activation request to a session management function entity; and activating, by the session management function entity, the PDU session based on the PDU session activation request.

In this embodiment of the present invention, the mobility management function entity can obtain the PDU session activation request including the identifier of the PDU session and the identifier of the terminal, and send the PDU session activation request to the session management function entity, thereby activating the PDU session. Therefore, according to the solution in this embodiment of the present invention, a PDU session can be activated as required without activating all PDU sessions for which connections have been established, thereby reducing signaling interaction between the terminal and a network, and helping reduce network load and save power of the terminal.

In a possible design, the mobility management function entity may obtain the PDU session activation request of the terminal in one of the following manners: Manner 1: The mobility management function entity may receive a control plane connection activation request from the terminal, where the control plane connection activation request includes the PDU session activation request. Manner 2: The mobility management function entity may receive the PDU session activation request from the terminal.

In a possible implementation, before the terminal sends the control plane connection activation request or the PDU session activation request to the mobility management function entity, the terminal may further generate the PDU session activation request.

In a possible design, the mobility management function entity may store a binding relationship among the identifier of the terminal, the identifier of the PDU session, and an identifier of the session management function entity, and before sending the PDU session activation request to the session management function entity, the mobility management function entity may further select, based on the identifier of the PDU session, the identifier of the terminal, and the binding relationship, a session management function entity identified by the identifier of the session management function entity.

In a possible design, the mobility management function entity may further receive a handover request from a target access node, where the handover request carries the identifier of the terminal and an identifier of the target access node, and the handover request is used to request a handover of the terminal from a source access node to the target access node; and then, the mobility management function entity may send a mobility event of the terminal to the session management function entity, where the mobility event includes the identifier of the terminal and the identifier of the target access node.

In this design, after receiving the mobility event of the terminal from the mobility management function entity, the session management function entity may determine at least one PDU session corresponding to the identifier of the terminal; and when the at least one PDU session is an idle-state PDU session, the session management function entity may determine whether a context of the at least one PDU session needs to be updated; or when the at least one PDU session is an active-state PDU session, the session management function entity may instruct the terminal and the target access node to update a context of the at least one PDU session.

In a possible implementation, when the at least one PDU session is the idle-state PDU session, and the context of the at least one PDU session includes an identifier of a first user plane function entity, the session management function entity may determine, based on a service area of the target access node and a service area list of the first user plane function entity, whether the context of the at least one PDU session needs to be updated. For example, if the service area of the target access node is not in the service area list of the first user plane function entity, the session management function entity may determine that the context of the at least one PDU session needs to be updated; or if the service area of the target access node is in the service area list of the first user plane function entity, the session management function entity may determine that the context of the at least one PDU session does not need to be updated.

Further, after determining that the context of the at least one PDU session needs to be updated, the session management function entity may further send a release message to the first user plane function entity, where the release message is used to instruct the first user plane function entity to release a configuration resource of the at least one PDU session, and may select a second user plane function entity for the terminal; and/or the session management function entity may further send a PDU session update message to the mobility management function entity, where the PDU session update message is used to update the context of the at least one PDU session. Correspondingly, after receiving the PDU session update message from the session management function entity, the mobility management function entity may further send the PDU session update message to the terminal. After receiving the PDU session update message from the mobility management function entity, the terminal may update the context of the at least one PDU session based on the PDU session update message.

According to another aspect, an embodiment of the present invention provides a session processing method, where the method includes: receiving, by a mobility management function entity, a handover request from a target access node, where the handover request carries an identifier of a terminal and an identifier of the target access node, and the handover request is used to request a handover of the terminal from a source access node to the target access node; sending, by the mobility management function entity, a mobility event of the terminal to a session management function entity, where the mobility event includes the identifier of the terminal and the identifier of the target access node; determining, by the session management function entity, at least one PDU session corresponding to the identifier of the terminal; and when the at least one PDU session is an idle-state PDU session, determining, by the session management function entity, whether a context of the at least one PDU session needs to be updated; or when the at least one PDU session is an active-state PDU session, instructing, by the session management function entity, the terminal and the target access node to update a context of the at least one PDU session.

In a possible design, when the at least one PDU session is the idle-state PDU session, and the context of the at least one PDU session may include an identifier of a first user plane function entity, the session management function entity may determine, based on a service area of the target access node and a service area list of the first user plane function entity, whether the context of the at least one PDU session needs to be updated. For example, if the service area of the target access node is not in the service area list of the first user plane function entity, the session management function entity determines that the context of the at least one PDU session needs to be updated; or if the service area of the target access node is in the service area list of the first user plane function entity, the session management function entity determines that the context of the at least one PDU session does not need to be updated.

In a possible design, after determining that the context of the at least one PDU session needs to be updated, the session management function entity may further send a release message to the first user plane function entity, where the release message is used to instruct the first user plane function entity to release a configuration resource of the at least one PDU session, and may select a second user plane function entity for the terminal; and/or the session management function entity may further send a PDU session update message to the mobility management function entity, where the PDU session update message is used to update the context of the at least one PDU session.

In a possible implementation, after receiving the PDU session update message from the session management function entity, the mobility management function entity may further send the PDU session update message to the terminal. Correspondingly, after receiving the PDU session update message from the mobility management function entity, the terminal may update the context of the at least one PDU session based on the PDU session update message.

According to still another aspect, an embodiment of the present invention provides a mobility management function entity, where the mobility management function entity has a function of implementing behavior of the mobility management function entity in the foregoing method design. The function may be implemented by hardware, or may be implemented by executing corresponding software by hardware. The hardware or software includes one or more modules corresponding to the foregoing function.

In a possible design, the mobility management function entity includes a processor, where the processor is configured to support the mobility management function entity in performing a corresponding function in the foregoing method. Further, the mobility management function entity may further include a communications interface, where the communications interface is configured to support communication between a session management function entity, a terminal, or another network element and the mobility management function entity. Further, the mobility management function entity may further include a memory, where the memory is coupled to the processor, and is configured to store a program instruction and data that are necessary for the mobility management function entity.

According to yet another aspect, an embodiment of the present invention provides a session management function entity, where the session management function entity has a function of implementing behavior of the session management function entity in the foregoing method design. The function may be implemented by hardware, or may be implemented by executing corresponding software by hardware. The hardware or software includes one or more modules corresponding to the foregoing function.

In a possible design, the session management function entity includes a processor, where the processor is configured to support the session management function entity in performing a corresponding function in the foregoing method. Further, the session management function entity may further include a communications interface, where the communications interface is configured to support communication between a mobility management function entity or another network element and the session management function entity. Further, the session management function entity may further include a memory, where the memory is coupled to the processor, and is configured to store a program instruction and data that are necessary for the session management function entity.

According to still yet another aspect, an embodiment of the present invention provides a terminal, where the terminal may implement a function of the terminal in the foregoing method design. The function may be implemented by hardware, or may be implemented by executing corresponding software by hardware. The hardware or software includes one or more modules corresponding to the foregoing function.

In a possible design, a structure of the terminal includes a processor and a transceiver, where the processor is configured to support the terminal in performing a corresponding function in the foregoing method. The transceiver is configured to support communication between a mobility management function entity, an access node, or another network element and the terminal. The terminal may further include a memory, where the memory is coupled to the processor, and is configured to store a program instruction and data that are necessary for the terminal.

According to a further aspect, an embodiment of the present invention provides a computer storage medium, configured to store a computer software instruction used by the foregoing mobility management function entity, and the computer software instruction includes a program designed for execution of the foregoing aspect.

According to a still further aspect, an embodiment of the present invention provides a computer storage medium, configured to store a computer software instruction used by the foregoing session management function entity, and the computer software instruction includes a program designed for execution of the foregoing aspect.

According to a yet further aspect, an embodiment of the present invention provides a computer storage medium, configured to store a computer software instruction used by the foregoing terminal, and the computer software instruction includes a program designed for execution of the foregoing aspect.

According to a still yet further aspect, an embodiment of the present invention provides a computer program product including an instruction. When the computer program product is executed on a computer, the instruction enables the computer to perform a function performed by the mobility management function entity in the foregoing method design.

According to even yet another aspect, an embodiment of the present invention provides a computer program product including an instruction. When the computer program product is executed on a computer, the instruction enables the computer to perform a function performed by the session management function entity in the foregoing method design.

According to still even yet another aspect, an embodiment of the present invention provides a computer program product including an instruction. When the computer program product is executed on a computer, the instruction enables the computer to perform a function performed by the terminal in the foregoing method design.

According to a still even yet further aspect, an embodiment of the present invention provides a communications system, where the system includes the mobility management function entity and the session management function entity according to the foregoing aspects; or the system includes the mobility management function entity, the session management function entity, and the terminal according to the foregoing aspects.

Compared with the prior art, in the solutions in the embodiments of the present invention, the mobility management function entity can obtain the PDU session activation request including the identifier of the PDU session and the identifier of the terminal, and send the PDU session activation request to the session management function entity, thereby activating the PDU session. Therefore, according to the solutions in the embodiments of the present invention, a PDU session can be activated as required without activating all PDU sessions for which connections have been established, thereby reducing signaling interaction between the terminal and a network, and helping reduce network load and save power of the terminal.

DESCRIPTION OF EMBODIMENTS

The following describes the technical solutions in the embodiments of the present invention with reference to the accompanying drawings in the embodiments of the present invention.

Figure 1:
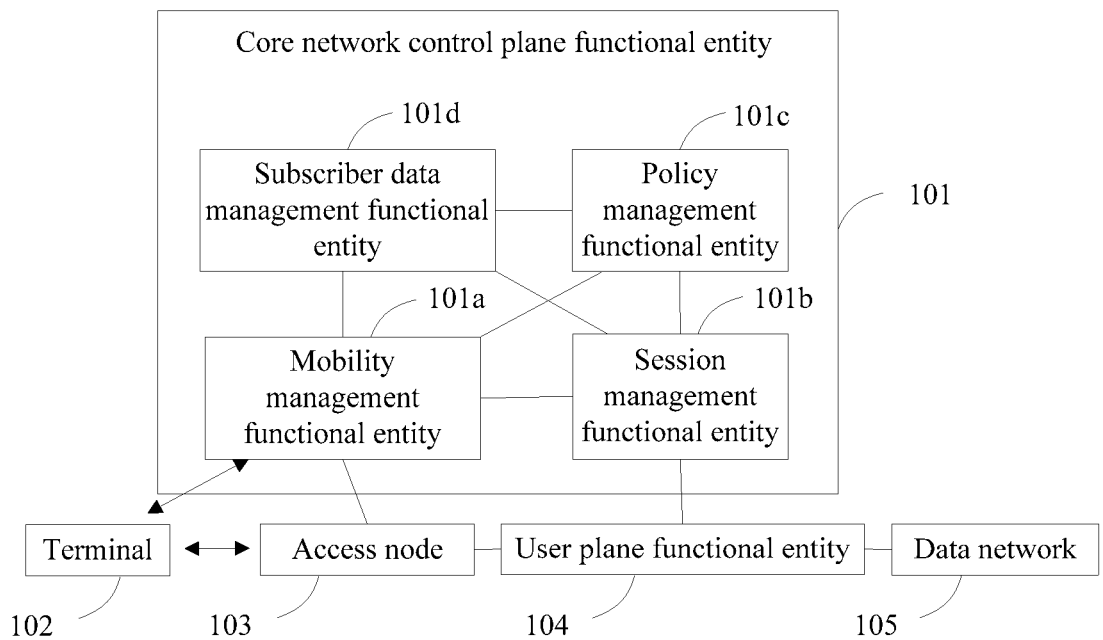
FIG. 1 is a schematic diagram of a possible network architecture according to an embodiment of the present invention.

With reference to FIG. 1, the following first describes a network architecture applicable to an embodiment of the present invention. FIG. 1 is a schematic diagram of a possible network architecture according to an embodiment of the present invention. As shown in FIG. 1, the network architecture includes a core network control plane function entity 101, a terminal 102, an access node 103, a user plane function entity 104, and a data network 105, where the core network control plane function entity 101 includes an MM function entity 101a, an SM function entity 101b, a policy management function entity 101c, and a subscriber data management function entity 101d.

The MM function entity is responsible for a connection between the terminal and the core network control plane function entity, and for maintenance and control of a connection between the access node (AN) and the core network control plane function entity, and supports the terminal in network access control, network location management, accessibility management, and the like.

The SM function entity is responsible for notifying the MM function entity of a requirement for a control plane connection of the terminal. Therefore, the MM function entity controls the control plane connection of the terminal based on the requirement of the SM function entity. The SM function entity is further responsible for management and maintenance of a PDU data connection of the terminal, that is, establishing context information of the data connection of the terminal. In addition, SM signaling sent by the SM function entity to the terminal and the AN is transferred to the terminal and the access node by using the MM function entity.

The subscriber data management (SDM) function entity is responsible for storing and managing subscription data of a subscriber. The subscription data of the subscriber may include an identifier of the subscriber, a key used to authenticate a terminal when the subscriber uses the terminal to access a network, information about a network service available to the subscriber, and the like. The subscriber data management function entity provides the subscription data of the subscriber for the MM function entity when the terminal accesses the network, so that the MM function entity can perform terminal authentication, access control, and the like on the terminal based on the subscription data of the subscriber.

The policy management function entity is also referred to as a policy control function entity, and is configured to: when a PDU session connection is established for the terminal, determine policies such as a quality of service (QoS) policy and a charging rule policy of the PDU session connection, and provide these policies for the SM function entity, so that the SM function entity further manages the PDU session connection according to these policies.

The terminal in this embodiment of the present invention may include various devices having a wireless communication function, such as a handheld device, an in-vehicle device, a wearable device, and a computing device, or another processing device connected to a wireless modem, user equipment (UE), a mobile station (MS), a terminal, and terminal equipment that are in various forms, and the like. For ease of description, the devices mentioned above are collectively referred to as "terminal".

The following further describes the embodiments of the present invention in detail with reference to the foregoing common aspects in the embodiments of the present invention.

In an existing solution, when an MM function is separated from an SM function, a plurality of PDU sessions may be set up for a terminal, and these PDU sessions may be concurrently activated. This makes signaling interaction between the terminal and a network frequent, causing relatively high network load and relatively quick power consumption of the terminal.

In view of this, the embodiments of the present invention provide a session activation method, and a mobility management function entity, a session management function entity, a terminal, and a system that are based on the method. The method includes: obtaining, by a mobility management function entity, a PDU session activation request of a terminal, where the PDU session activation request includes an identifier of a PDU session and an identifier of the terminal, and the PDU session activation request is used to request activation of the PDU session; sending, by the mobility management function entity, the PDU session activation request to a session management function entity; and after receiving the PDU session activation request, activating, by the session management function entity, the PDU session based on the PDU session activation request. In the solutions in the embodiments of the present invention, the mobility management function entity can obtain the PDU session activation request including the identifier of the PDU session and the identifier of the terminal, and send the PDU session activation request to the session management function entity, thereby activating the PDU session. Therefore, according to the solutions in the embodiments of the present invention, a PDU session can be activated as required without activating all PDU sessions for which connections have been established, thereby reducing signaling interaction between the terminal and a network, and helping reduce network load and save power of the terminal.

Figure 2:
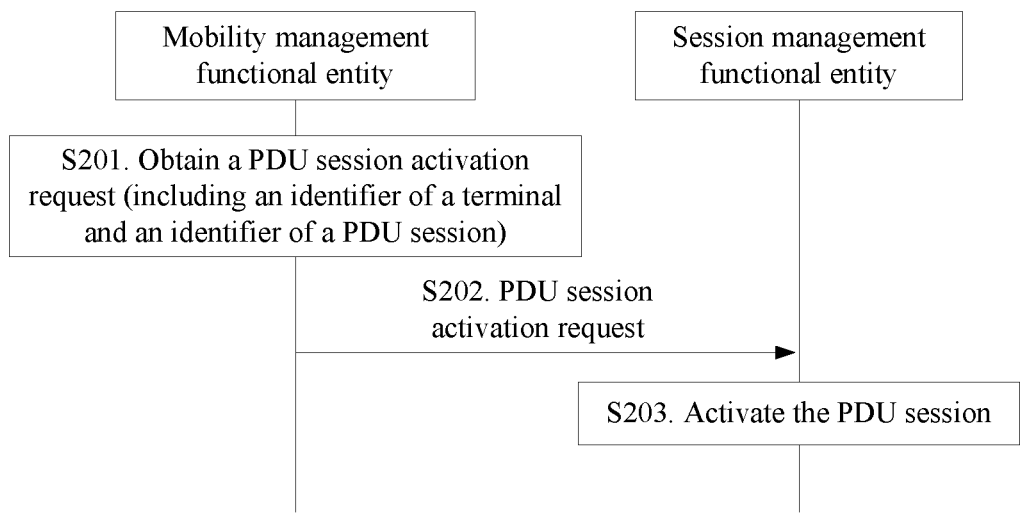
FIG. 2 is a schematic communication diagram of a session activation method according to an embodiment of the present invention.

The following describes a solution in the embodiments of the present invention with reference to FIG. 2. FIG. 2 is a schematic communication diagram of a session activation method according to an embodiment of the present invention. As shown in FIG. 2, the method includes steps S201 to S203.

Part S201: A mobility management function entity obtains a PDU session activation request of a terminal, where the PDU session activation request includes an identifier of a PDU session and an identifier of the terminal.

The PDU session activation request is used to activate the PDU session.

In an example, the mobility management function entity may obtain the PDU session activation request of the terminal in one of the following manners.

Manner 1: The mobility management function entity may receive a control plane connection activation request from the terminal, where the control plane connection activation request includes the PDU session activation request. For example, the following step S502 in FIG. 5 uses this manner. In this case, a control plane connection is in an idle state. When the terminal needs to activate the PDU session, the terminal may activate the control plane connection first, and in this case, adds an activation request of the PDU session to the control plane connection activation request, to reduce control signaling overheads.

Manner 2: The mobility management function entity may receive the PDU session activation request from the terminal. For example, the following step S406 in FIG. 4 uses this manner. In this case, a control plane connection is already in an active state. When the terminal needs to activate the PDU session, the terminal may directly send the PDU session activation request to the mobility management function entity, to reduce control signaling overheads.

Certainly, the mobility management function entity may also obtain the PDU session activation request of the terminal in another manner. This is not limited in this embodiment of the present invention.

It should be noted that the identifier of the terminal is used to identify the terminal and the identifier of the PDU session is used to identify the PDU session.

Step S202: The mobility management function entity sends the PDU session activation request to a session management function entity.

In an example, the mobility management function entity stores a binding relationship among the identifier of the terminal, the identifier of the PDU session, and an identifier of the session management function entity. Before sending the PDU session activation request to the session management function entity, the mobility management function entity may select, based on the identifier of the PDU session, the identifier of the terminal, and the binding relationship, a session management function entity identified by the identifier of the session management function entity. For example, before the session activation method shown in FIG. 2 is implemented, a PDU session registration method shown in FIG. 3 may be implemented in the embodiments of the present invention, where the mobility management function entity may store the binding relationship in the PDU session registration method. For details, refer to description in FIG. 3.

Step S203: The session management function entity activates the PDU session based on the PDU session activation request.

In an example, the mobility management function entity may further receive a handover request from a target access node, where the handover request carries the identifier of the terminal and an identifier of the target access node, and the handover request is used to request a handover of the terminal from a source access node to the target access node. Then, the mobility management function entity may send a mobility event of the terminal to the session management function entity, where the mobility event includes the identifier of the terminal and the identifier of the target access node. After receiving the mobility event of the terminal from the mobility management function entity, the session management function entity may determine at least one PDU session corresponding to the identifier of the terminal; and when the at least one PDU session is an idle-state PDU session, the session management function entity may determine whether a context of the at least one PDU session needs to be updated; or when the at least one PDU session is an active-state PDU session, the session management function entity may instruct the terminal and the target access node to update a context of the at least one PDU session.

In this example, the at least one PDU session corresponding to the identifier of the terminal may be in an idle state or in an active state. In a solution of this example, the context of the at least one PDU session may be processed in different manners based on a status of the at least one PDU session.

In a possible implementation, when the at least one PDU session is the idle-state PDU session, and the context of the at least one PDU session includes an identifier of a first user plane function entity, the session management function entity may determine, in the following manner, whether the context of the at least one PDU session needs to be updated: The session management function entity may determine, based on a service area of the target access node and a service area list of the first user plane function entity, whether the context of the at least one PDU session needs to be updated. For example, if the service area of the target access node is not in the service area list of the first user plane function entity, the session management function entity determines that the context of the at least one PDU session needs to be updated; or if the service area of the target access node is in the service area list of the first user plane function entity, the session management function entity determines that the context of the at least one PDU session does not need to be updated.

In an example, after determining that the context of the at least one PDU session needs to be updated, the session management function entity may further send a release message to the first user plane function entity, where the release message is used to instruct the first user plane function entity to release a configuration resource of the at least one PDU session, and may select a second user plane function entity for the terminal; and/or the session management function entity may further send a PDU session update message to the mobility management function entity, where the PDU session update message is used to update the context of the at least one PDU session.

Figure 3:
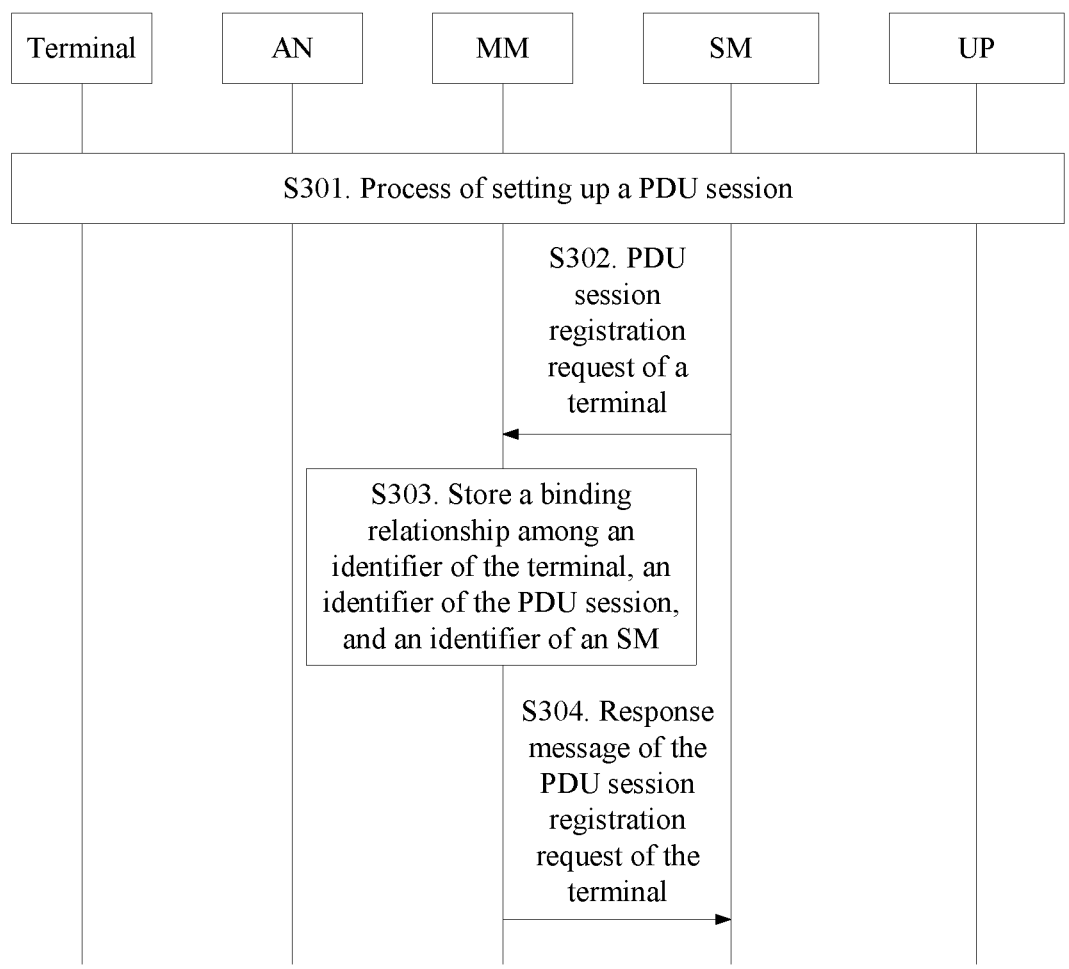
FIG. 3 is a schematic communication diagram of a session registration method according to an embodiment of the present invention.
Figure 4:
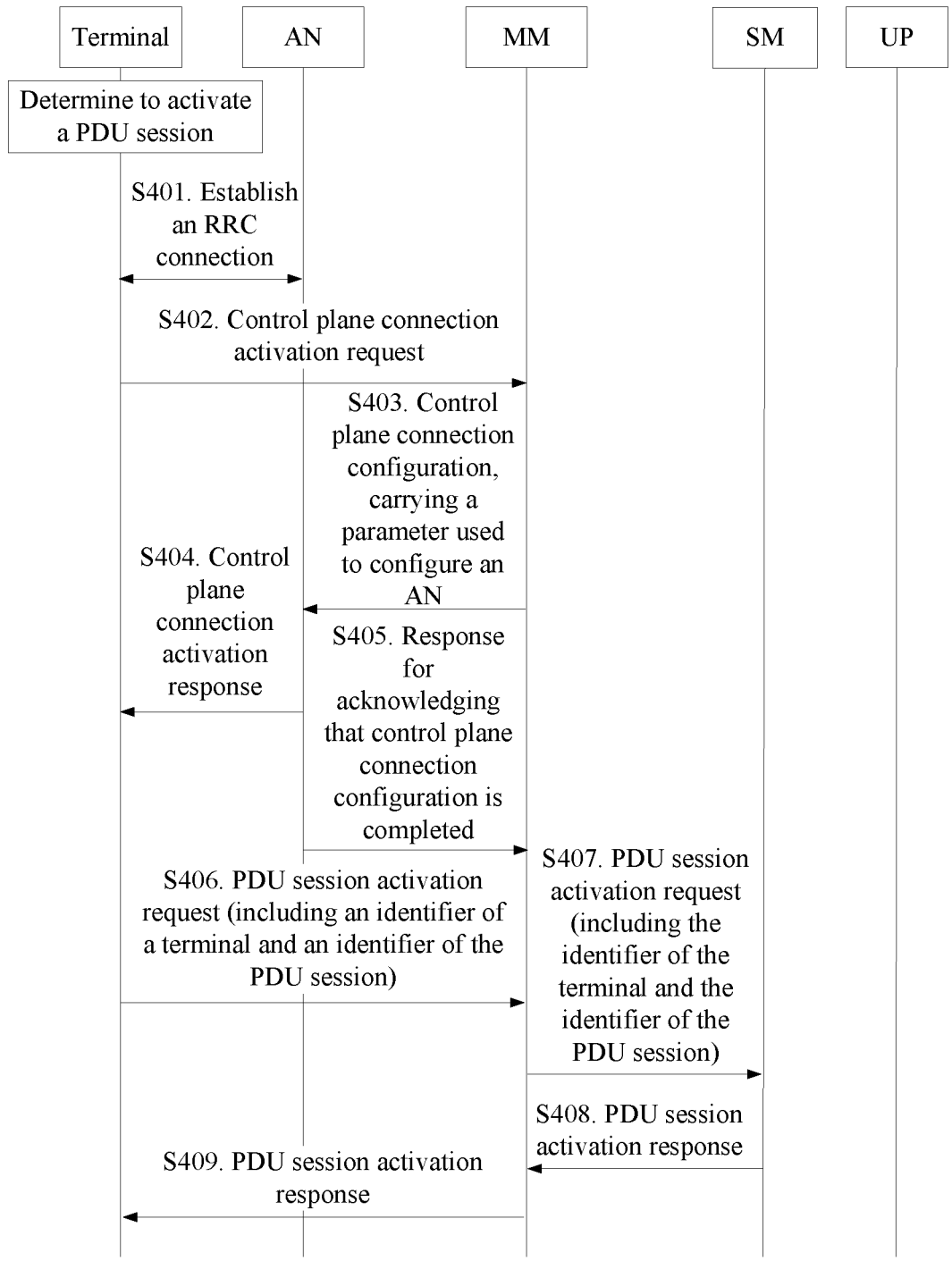
FIG. 4 is a schematic communication diagram of another session activation method according to an embodiment of the present invention.
Figure 5:
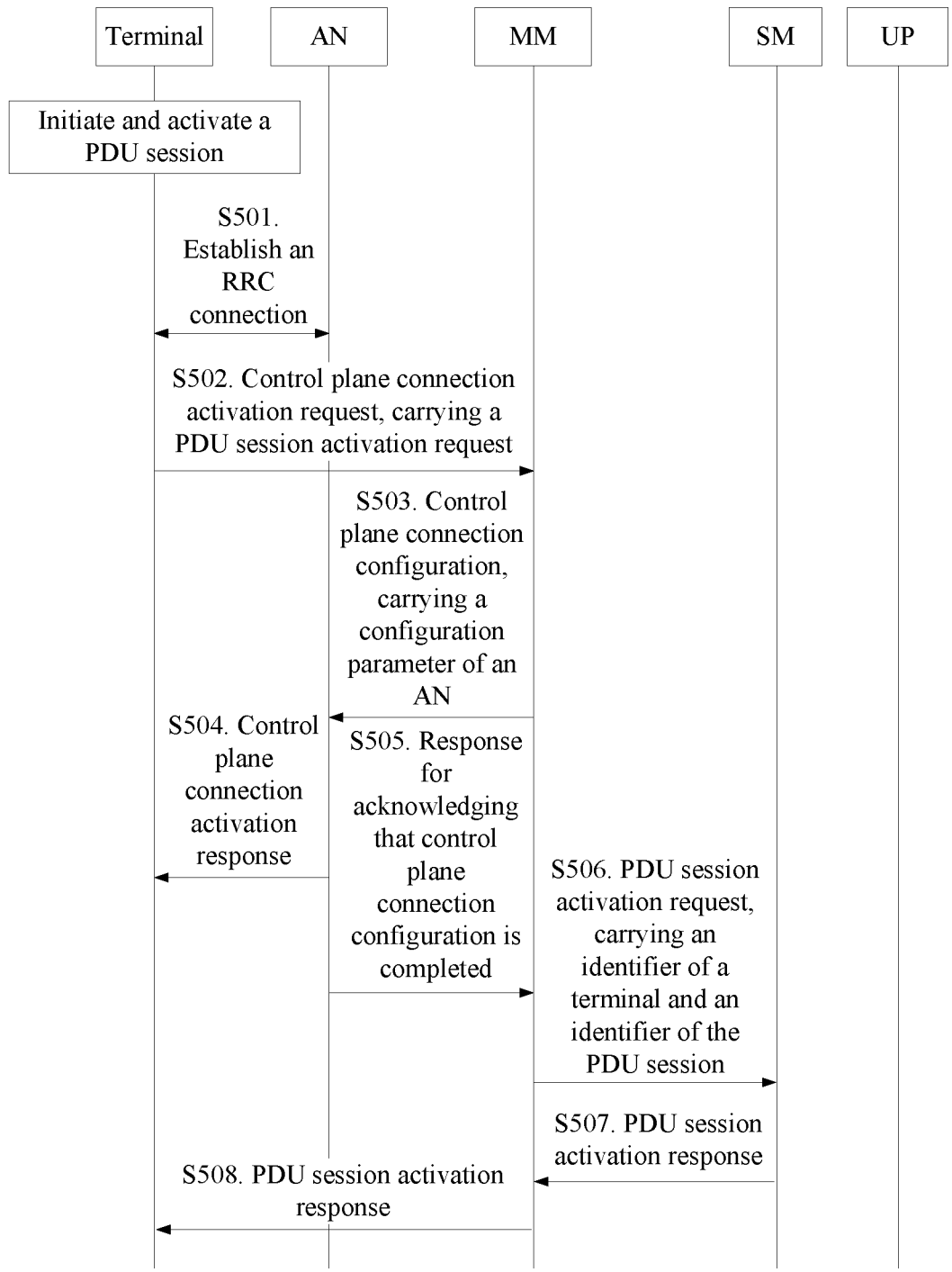
FIG. 5 is a schematic communication diagram of still another session activation method according to an embodiment of the present invention.

The following further describes the solutions in the embodiments of the present invention with reference to FIG. 3 to FIG. 5. In FIG. 3 to FIG. 5, "MM" is used to represent a mobility management function entity, "SM" is used to represent a session management function entity, "UP" is used to represent a user plane function entity, and "AN" is used to represent an access node, to describe the solutions in the embodiments of the present invention.

FIG. 3 is a schematic communication diagram of a session registration method according to an embodiment of the present invention. The method shown in FIG. 3 may be performed before the method shown in FIG. 2. The session registration method shown in FIG. 3 includes steps S301 to S304.

Step S301: Perform a process of setting up a PDU session among a terminal, an AN, an MM, an SM, and a UP.

Step S302: The SM sends a PDU session registration request of the terminal to the MM.

The PDU session registration request carries an identifier of the terminal, an identifier of the PDU session, and an identifier of the SM. The identifier of the PDU session is used to distinguish between different PDU sessions. For example, PDU sessions belonging to one service type uniquely correspond to one PDU session identifier. The identifier of the SM is used to identify a session management function entity serving the terminal.

Step S303: The MM stores a binding relationship among an identifier of the terminal, an identifier of the PDU session, and an identifier of the SM.

Step S304: The MM sends a response message of the PDU session registration request to the SM.

In an existing solution, after an MM function and an SM function are separated, a plurality of PDU sessions may be set up for a terminal. Due to a reason such as a type difference, these PDU sessions may be processed by different SM functional entities, and the different SM functional entities may be deployed at different network locations. This makes signaling interaction between an MM function entity and an SM function entity and signaling interaction between the terminal and a network quite complex. In the solution shown in FIG. 3, each PDU session uniquely corresponds to one PDU session identifier, the MM function entity can store the binding relationship among the identifier of the terminal, the identifier of the PDU session, and the identifier of the SM function entity, thereby facilitating signaling interaction between the network elements after separation between the MM function entity and the SM function entity.

Currently, in an EPC, the terminal establishes a data connection to a network side through a packet data network (PDN) connection. A status of the PDN connection and a status of a control plane connection of the terminal are synchronous. The status of the PDN connection and the status of the control plane connection are represented by using a same connection state machine. For example, the statuses are represented by using an evolved packet system connection management (ECM) connection status. When the ECM connection status is an idle state, the PDN connection and the control plane connection are both in an idle state. When the ECM connection status is a connected state, the PDN connection and the control plane connection are both in a connected state. The idle state may be represented as an ECM_Idle state, and the connected state may be represented as an ECM_Connected state. The terminal in the ECM_Idle state triggers activation of the PDN connection when activating the control plane connection by using a service request.

However, after the mobility management function and the session management function are separated, the terminal establishes a data connection to the network side by using a PDU session. In this case, the status of the control plane connection is maintained by the MM. Herein, the status of the control plane connection includes a control plane idle state and a control plane connected state. A status of the PDU session is maintained by the SM. Herein, the status of the PDU session includes an idle state and an active state. The control plane idle state may be represented as a CM_Idle state, the control plane connected state may be represented as a CM_Connected state, the idle state of the PDU session may be represented as an SM_Idle state, and the active state of the PDU session may be represented as an SM_Active state.

Based on the method shown in FIG. 2, the following further describes the solutions in the embodiments of the present invention with reference to FIG. 4 and FIG. 5. In the method shown in FIG. 4, when a control plane connection is in a CM_Idle state, the control plane connection needs to be activated first, and then a PDU session is activated. In the method shown in FIG. 5, when a control plane connection is in a CM_Connected state, a PDU session may be directly activated.

FIG. 4 is a schematic communication diagram of another session activation method according to an embodiment of the present invention. As shown in FIG. 4, the method includes steps S401 to S409.

Step S401: A terminal and an AN establish a radio resource control (RRC) connection.

After the terminal determines to activate a PDU session, the terminal and the AN establish the RRC connection.

Step S402: The terminal sends a control plane connection activate request (CP connection activate request) to an MM.

Step S403: The MM sends a control plane connection configuration message to the AN, where the control plane connection configuration message carries a parameter used to configure the AN and a control plane connection activation response.

Step S404: The AN sends the control plane connection activation response to the terminal.

Step S405: The AN sends, to the MM, a response for acknowledging that control plane connection configuration is completed.

Step S406: The terminal sends a PDU session activation request to the MM, where the PDU session activation request carries an identifier of the terminal and an identifier of a PDU session.

Step S407: The MM sends the PDU session activation request to an SM.

In an example, the MM finds, based on a stored binding relationship among the identifier of the terminal, an identifier of the SM, and the identifier of the PDU session, the identifier of the SM corresponding to the identifier of the terminal and the identifier of the PDU session, and sends the PDU session activation request to an SM corresponding to the identifier of the SM.

Step S408: The SM sends a PDU session activation response to the MM.

Specifically, after activating a PDU session corresponding to the identifier of the PDU session, the SM sends the PDU session activation response to the MM.

Step S409: The MM sends the PDU session activation response to the terminal.

Specifically, after receiving the PDU session activation response, the terminal can learn that the PDU session has been activated.

FIG. 5 is a schematic communication diagram of still another session activation method according to an embodiment of the present invention. For same or similar content between the method shown in FIG. 5 and the method shown in FIG. 4, refer to detailed descriptions in FIG. 4. Details are not described herein again. As shown in FIG. 5, the method includes steps S501 to S508. Step S501 is the same as or similar to step S401, steps S503 to S505 are the same as or similar to steps S403 to S405, respectively, and steps S506 to S508 are the same as or similar to steps S407 to S409, respectively. FIG. 5 differs from FIG. 4 in that the control plane connection activation request sent by the terminal to the MM in step S502 carries the PDU session activation request, and behavior of step S406 in FIG. 4 does not need to be performed in the method shown in FIG. 5.

In this embodiment of the present invention, in addition to the identifier of the terminal, the PDU session activation request further carries the identifier of the PDU session, so that different PDU sessions of the terminal can be distinguished. Therefore, when PDU session activation is performed according to the solution in this embodiment of the present invention, a corresponding PDU session can be activated as required based on the identifier of the PDU session. For example, a PDU session of a specific service type may be activated as required.

In practice, the terminal may be handed over between different ANs. In an existing solution, all data connections of a terminal need to be processed when the terminal is handed over. However, after a mobility management function and a session management function are separated, a PDU session corresponding to the terminal may be in an idle state or an active state, or there may be both an idle-state PDU session and an active-state PDU session that correspond to the terminal. In the existing solution, the idle-state PDU session and the active-state PDU session cannot be processed in different manners.

In view of this, the embodiments of the present invention provide a session processing method, and a mobility management function entity, a session management function entity, a terminal, and a system that are based on the method. The method includes: receiving, by a mobility management function entity, a handover request from a target access node, where the handover request carries an identifier of a terminal and an identifier of the target access node, and the handover request is used to request a handover of the terminal from a source access node to the target access node; sending, by the mobility management function entity, a mobility event of the terminal to a session management function entity, where the mobility event includes the identifier of the terminal and the identifier of the target access node; determining, by the session management function entity, at least one PDU session corresponding to the identifier of the terminal; and when the at least one PDU session is an idle-state PDU session, determining, by the session management function entity, whether a context of the at least one PDU session needs to be updated; or when the at least one PDU session is an active-state PDU session, instructing, by the session management function entity, the terminal and the target access node to update a context of the at least one PDU session.

In an example, when the at least one PDU session is the idle-state PDU session, and the context of the at least one PDU session may include an identifier of a first user plane function entity, the session management function entity may determine, based on a service area of the target access node and a service area list of the first user plane function entity, whether the context of the at least one PDU session needs to be updated. For example, if the service area of the target access node is not in the service area list of the first user plane function entity, the session management function entity determines that the context of the at least one PDU session needs to be updated; or if the service area of the target access node is in the service area list of the first user plane function entity, the session management function entity determines that the context of the at least one PDU session does not need to be updated.

In an example, after determining that the context of the at least one PDU session needs to be updated, the session management function entity may further send a release message to the first user plane function entity, where the release message is used to instruct the first user plane function entity to release a configuration resource of the at least one PDU session, and may select a second user plane function entity for the terminal; and/or the session management function entity may further send a PDU session update message to the mobility management function entity, where the PDU session update message is used to update the context of the at least one PDU session.

In this example, after receiving the PDU session update message from the session management function entity, the mobility management function entity may further send the PDU session update message to the terminal. Correspondingly, after receiving the PDU session update message from the mobility management function entity, the terminal may update the context of the at least one PDU session based on the PDU session update message, where the at least one PDU session is the idle-state PDU session.

It should be noted that, in the embodiments of the present invention, the foregoing session processing method may be performed after the method shown in FIG. 2 is performed, or may be directly performed when the method shown in FIG. 2 is not performed.

Figure 6:
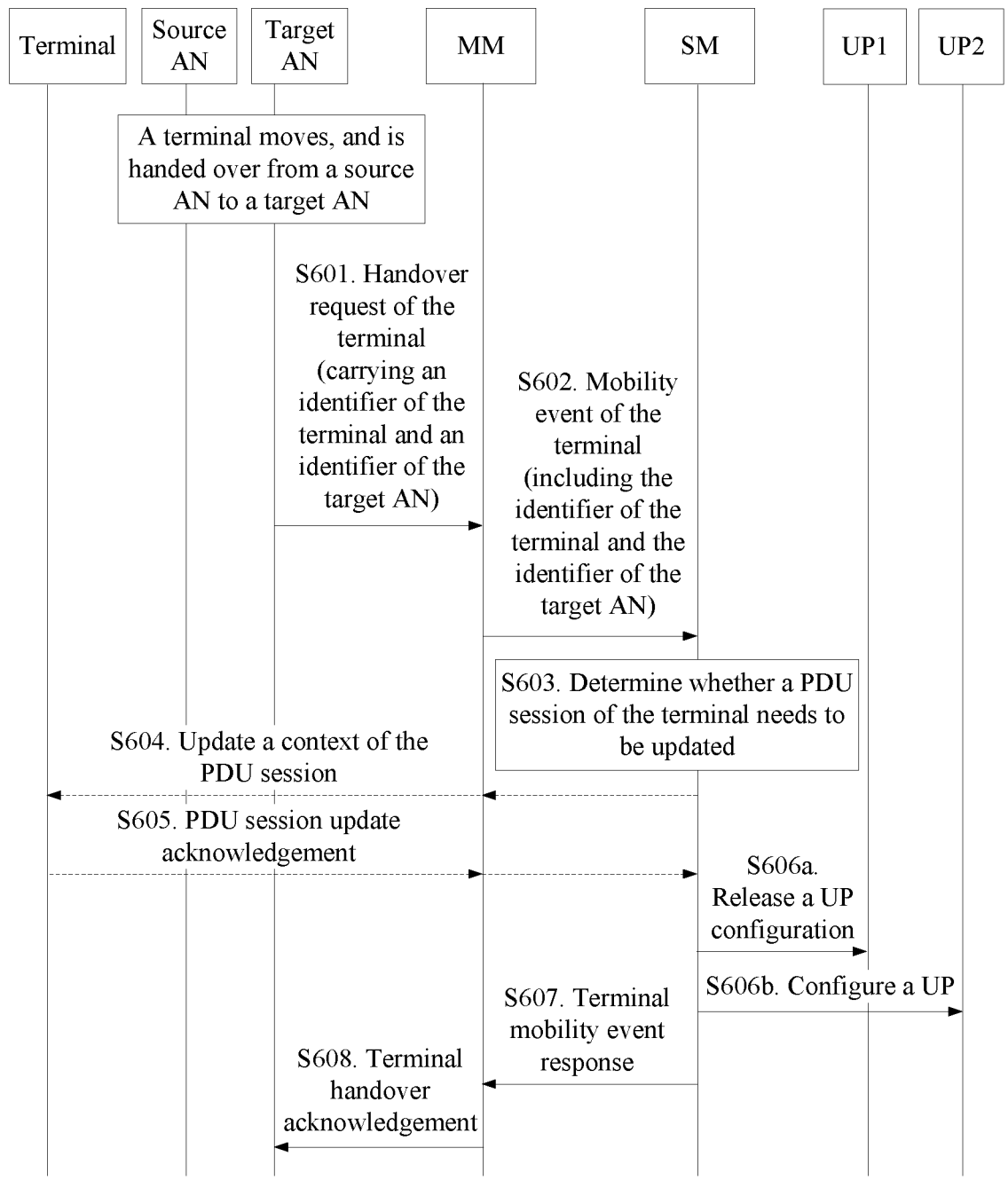
FIG. 6 is a schematic communication diagram of a session processing method according to an embodiment of the present invention.
Figure 7:
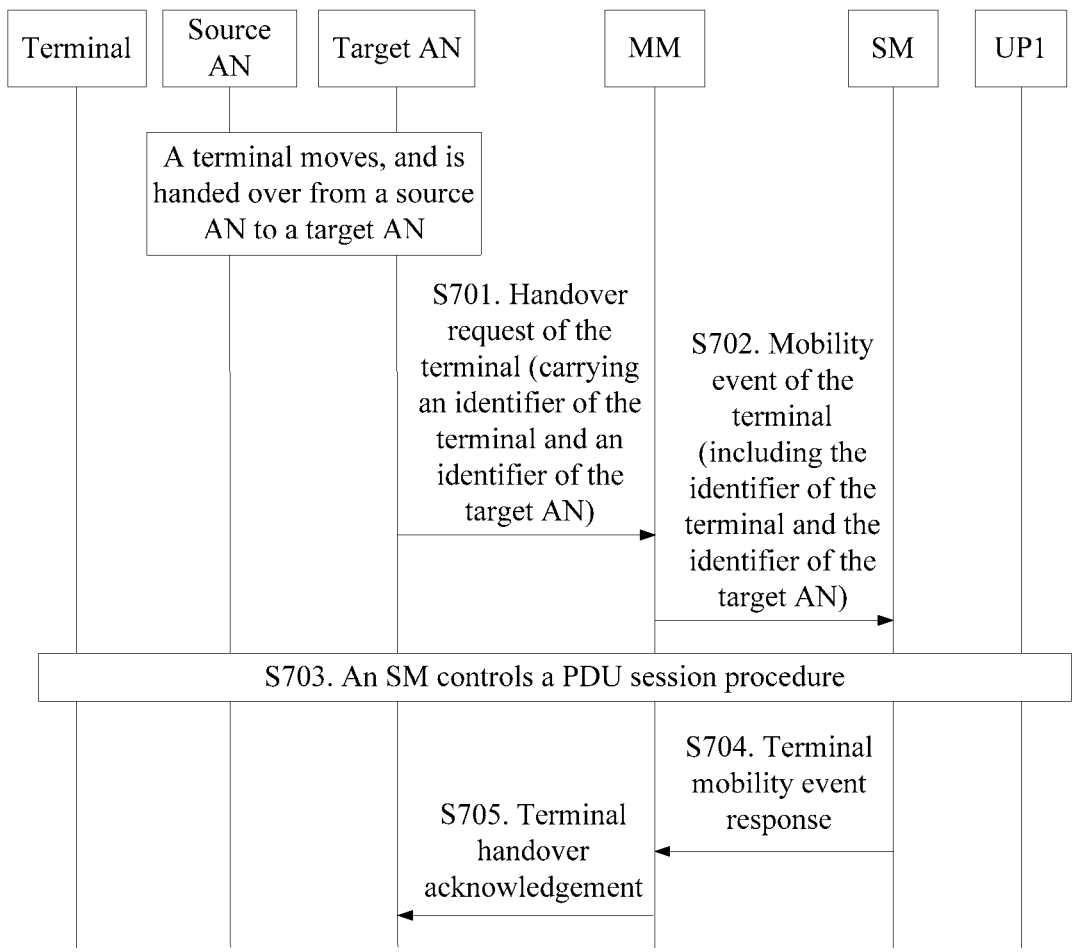
FIG. 7 is a schematic communication diagram of another session processing method according to an embodiment of the present invention.

The following further describes the foregoing session processing method with reference to FIG. 6 and FIG. 7. In FIG. 6 and FIG. 7, "MM" is used to represent a mobility management function entity, "SM" is used to represent a session management function entity, "UP1" is used to represent a first user plane function entity, "UP2" is used to represent a second user plane function entity, "source AN" is used to represent a source access node, and "target AN" is used to represent a target access node, to describe the solutions in the embodiments of the present invention.

FIG. 6 shows a session processing method for an idle-state PDU session when a terminal moves and an AN is to be changed. FIG. 7 shows a session processing method for an active-state PDU session when a terminal moves and an AN is to be changed.

FIG. 6 is a schematic communication diagram of a session processing method according to an embodiment of the present invention. As shown in FIG. 6, the procedure includes steps S601 to S608.

Step S601: A target AN sends a handover request of a terminal to an MM, where the handover request of the terminal carries an identifier of the terminal and an identifier of the target AN. For example, the handover request may be a path switch request.

Before this step, the terminal moves, and is to be handed over from a source AN to the target AN. The identifier of the terminal is used to identify the terminal, and the identifier of the target AN is used to identify the target AN.

Step S602: The MM sends a mobility event of the terminal to an SM, where the mobility event includes the identifier of the terminal and the identifier of the target AN.

Step S603: The SM determines whether the idle-state PDU session needs to be updated.

For details about whether a PDU session of the terminal needs to be updated, refer to FIG. 2 and related description thereof. Details are not described herein again.

Step S604: The SM sends a context update message of the idle-state PDU session to the MM, and the MM sends the context update message of the PDU session to the terminal.

Correspondingly, the terminal updates a context of the PDU session based on the context update message of the PDU session. The context of the PDU session may include the identifier of the terminal, an identifier of the PDU session, an identifier of an SM corresponding to the PDU session or a network address allocated by a UP to the terminal, and a connection status of the PDU session, where the connection status of the PDU session includes an idle state and an active state.

Step S605: The terminal sends a context update acknowledgement of the PDU session to the MM, and the MM sends the context update acknowledgement of the PDU session to the SM.

It should be noted that after the context of the idle-state PDU session is updated, the PDU session is still in the idle state.

Step S606a: The SM sends a UP configuration instruction to a UP1.

In this step, the UP configuration instruction is used to release a resource configured by the UP1 for the terminal, and delete the identifier of the terminal from a service list of the UP1.

Step S606b: The SM sends a UP configuration instruction to a UP2.

In this step, the SM selects the UP2, and the UP2 provides a service for the terminal. The configuration instruction sent to the UP2 includes information such as the identifier of the terminal, the identifier of the PDU session, and QoS and a charging configuration that correspond to the PDU session.

In addition, when the SM selects the UP2 for the PDU session, the SM or the UP corresponding to the PDU session may reassign a network address to the terminal. The network address is a network address used when the terminal receives and sends data, and a type of the network address may be Internet Protocol version 4 (IPv4), Internet Protocol version 6 (IPv6), or the like.

Step S607: The SM sends a terminal mobility event response to the MM.

Step S608: The MM sends a terminal handover acknowledgement to the target AN.

In this embodiment of the present invention, when the terminal moves, the idle-state PDU session is processed, to avoid a case in which in the prior art, when a terminal moves, an AN participates in processing of all PDU sessions of the terminal. This saves network resources, and improves processing efficiency when the terminal moves.

FIG. 7 is a schematic communication diagram of another session processing method according to an embodiment of the present invention. For same or similar content between the method shown in FIG. 7 and the method shown in FIG. 6, refer to detailed descriptions in FIG. 6. Details are not described herein again. As shown in FIG. 7, the method includes steps S701 to S705. Steps S701 to S702 are the same as or similar to steps S601 to S602, respectively, and steps S704 to S705 are the same as or similar to steps S607 to S608, respectively. For a procedure for controlling a PDU session by an SM in step S703, refer to an existing procedure. Details are not described herein.

In this embodiment of the present invention, when the terminal moves, only the active-state PDU session is processed, to avoid a case in which in the prior art, when a terminal moves, an access node participates in processing of all PDU sessions of the terminal. This saves network resources, and improves processing efficiency when the terminal moves.

The foregoing mainly describes the solutions in the embodiments of the present invention from the perspective of interaction between network elements. It should be understood that, to implement the foregoing functions, each network element, for example, the mobility management function entity, the session management function entity, or the terminal, includes a corresponding hardware structure and/or a software module implementing the function. A person skilled in the art should be easily aware that, in combination with the example units and algorithm steps described in the embodiments disclosed in the specification, the present invention can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

The mobility management function entity, the session management function entity, the terminal, and the like may be divided into functional units according to the foregoing method examples in the embodiments of the present invention. For example, each functional unit may be obtained through division according to each function, or two or more than two functions may be integrated into one processing unit. The integrated unit may be implemented in a form of hardware, or may be implemented in a form of a software functional unit. It should be noted that the unit division in the embodiments of the present invention is an example, and is merely logical function division, and there may be other division in actual implementation.

Figure 8A:
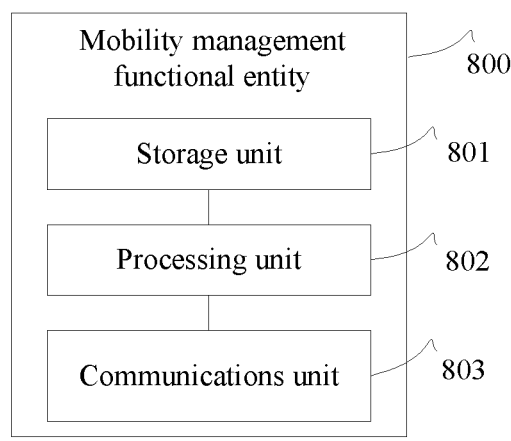
FIG. 8a is a schematic structural diagram of a mobility management function entity according to an embodiment of the present invention.

When an integrated unit is used, FIG. 8a is a possible schematic structural diagram of the mobility management function entity in the foregoing embodiments. The mobility management function entity includes a processing unit 802 and a communications unit 803. The processing unit 802 is configured to control and manage an action of the mobility management function entity. For example, the processing unit 802 is configured to support the mobility management function entity in performing steps S201 and S202 in FIG. 2, steps S301, S303, and S304 in FIG. 3, steps S403, S407, and S409 in FIG. 4, steps S503, S506, and S508 in FIG. 5, steps S602, S604, S605, and S608 in FIG. 6, steps S702, S703, and S705 in FIG. 7, and/or other steps of the technologies described in the specification. The communications unit 803 is configured to support the mobility management function entity in communicating with another network entity, for example, communicating with the terminal, the access node, the session management function entity, the subscriber data management function entity, the policy management function entity, and the like shown in FIG. 1. The mobility management function entity may further include a storage unit 801, configured to store program code and data of the mobility management function entity.

The processing unit 802 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications unit 803 may be a communications interface, a transceiver, a transceiver circuit, or the like, where the communications interface is a collective name, and may include one or more interfaces. The storage unit 801 may be a memory.

Figure 8B:
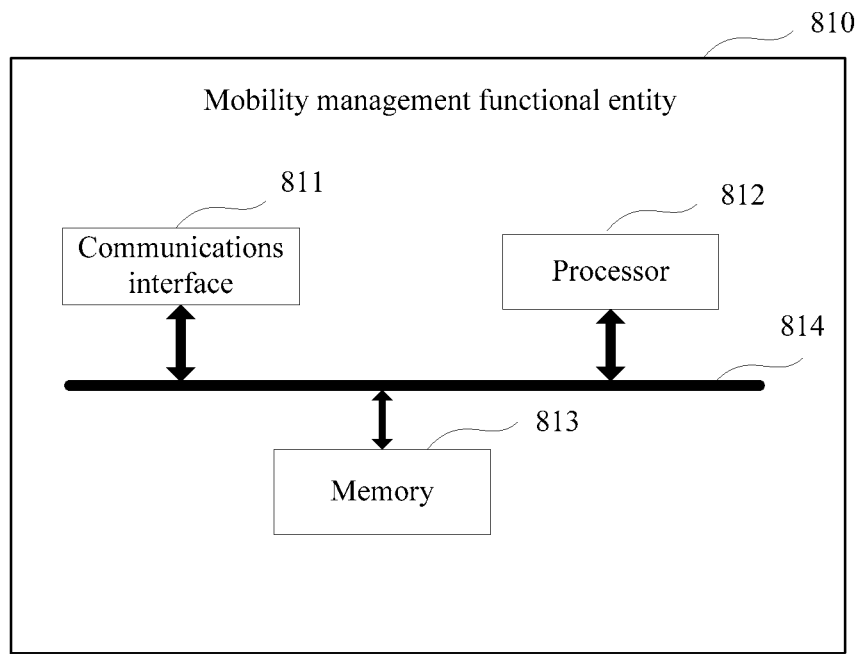
FIG. 8b is a schematic structural diagram of another mobility management function entity according to an embodiment of the present invention.

When the processing unit 802 is a processor, the communications unit 803 is a communications interface, and the storage unit 801 is a memory, the mobility management function entity in the embodiments of the present invention may be a mobility management function entity shown in FIG. 8b.

Referring to FIG. 8b, the mobility management function entity 810 includes a processor 812, a communications interface 811, and a memory 813. Optionally, the mobility management function entity 810 may further include a bus 814. The processor 812, the communications interface 811, and the memory 813 may be connected to each other by using the bus 814. The bus 814 may be a Peripheral Component InterconnectPCI) bus, an extended industry standard architecture (EISA) bus, or the like. The bus 814 may be classified into an address bus, a data bus, a control bus, and the like. For ease of representation, only one thick line is used to represent the bus in FIG. 8b, but this does not mean that there is only one bus or only one type of bus.

Figure 9A:
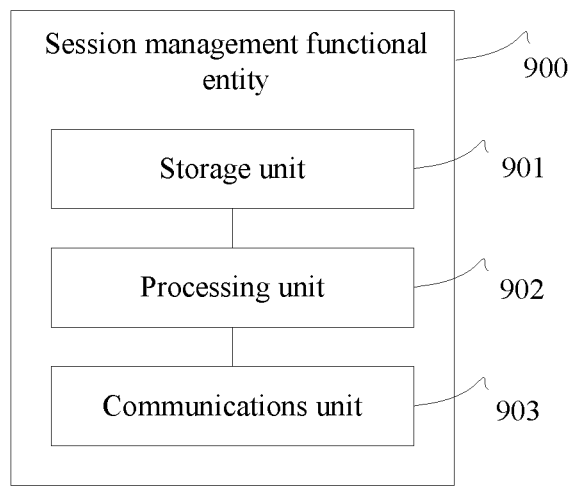
FIG. 9a is a schematic structural diagram of a session management function entity according to an embodiment of the present invention.

When an integrated unit is used, FIG. 9a is a possible schematic structural diagram of the session management function entity in the foregoing embodiments. The session management function entity includes a processing unit 902 and a communications unit 903. The processing unit 902 is configured to control and manage an action of the session management function entity. For example, the processing unit 902 is configured to support the session management function entity in performing step S203 in FIG. 2, steps S301 and S302 in FIG. 3, step S408 in FIG. 4, step S507 in FIG. 5, steps S603, S604, S606a, S606b, and S607 in FIG. 6, steps S703 and S704 in FIG. 7, and/or other steps of the technologies described in the specification. The communications unit 903 is configured to support the session management function entity in communicating with another network entity, for example, communicating with the mobility management function entity, the subscriber data management function entity, the policy management function entity, the user plane function entity, and the like shown in FIG. 1. The session management function entity may further include a storage unit 901, configured to store program code and data of the session management function entity.

The processing unit 902 may be a processor or a controller, such as a CPU, a general-purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications unit 903 may be a communications interface, a transceiver, a transceiver circuit, or the like, where the communications interface is a collective name, and may include one or more interfaces. The storage unit 901 may be a memory.

Figure 9B:
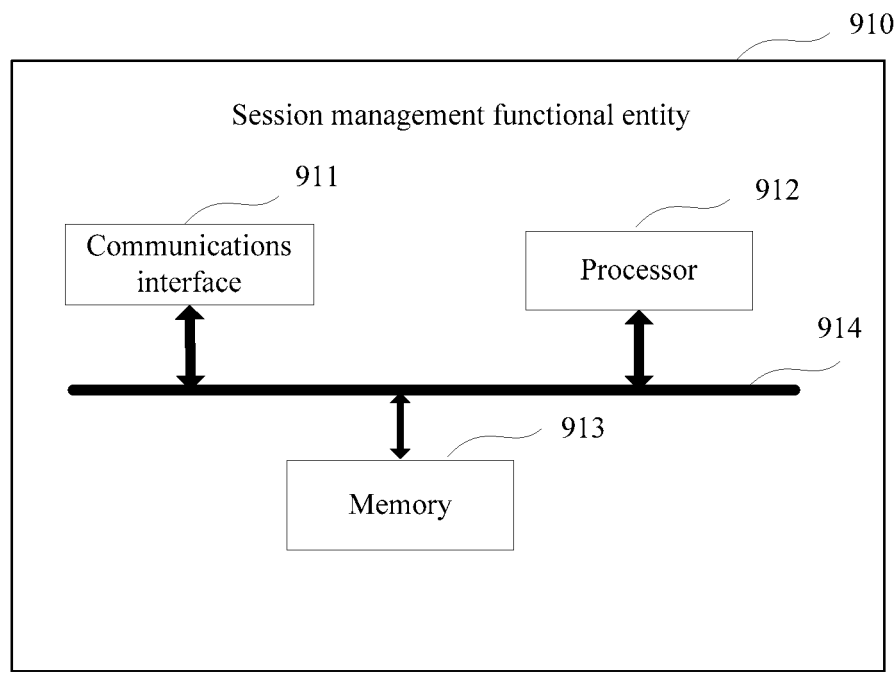
FIG. 9b is a schematic structural diagram of another session management function entity according to an embodiment of the present invention.

When the processing unit 902 is a processor, the communications unit 903 is a communications interface, and the storage unit 901 is a memory, the session management function entity in the embodiments of the present invention may be a session management function entity shown in FIG. 9b.

Referring to FIG. 9b, the session management function entity 910 includes a processor 912, a communications interface 911, and a memory 913. Optionally, the session management function entity 910 may further include a bus 914. The processor 912, the communications interface 911, and the memory 913 may be connected to each other by using the bus 914. The bus 914 may be a PCI bus, an EISA bus, or the like. The bus 914 may be classified into an address bus, a data bus, a control bus, and the like. For ease of representation, only one thick line is used to represent the bus in FIG. 9b, but this does not mean that there is only one bus or only one type of bus.

Figure 10A:
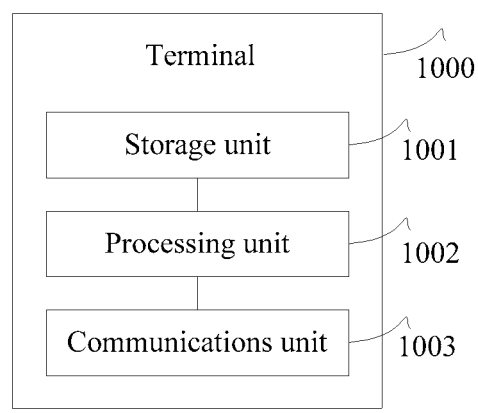
FIG. 10a is a schematic structural diagram of a terminal according to an embodiment of the present invention.

When an integrated unit is used, FIG. 10a is a possible schematic structural diagram of the terminal in the foregoing embodiments. The terminal includes a processing unit 1002 and a communications unit 1003. The processing unit 1002 is configured to control and manage an action of the terminal. For example, the processing unit 1002 is configured to support the terminal in performing step S301 in FIG. 3, steps S401, S402, and S406 in FIG. 4, steps S501 and S502 in FIG. 5, step S605 in FIG. 6, step S703 in FIG. 7, and/or other steps of the technologies described in the specification. The communications unit 1003 is configured to support the terminal in communicating with another network entity, for example, communicating with the access node, the mobility management function entity, and the like shown in FIG. 1. The terminal may further include a storage unit 1001, configured to store program code and data of the terminal.

The processing unit 1002 may be a processor or a controller, such as a CPU, a general-purpose processor, a DSP, an ASIC, an FPGA or another programmable logic device, a transistor logic device, a hardware component, or any combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications unit 1003 may be a communications interface, a transceiver, a transceiver circuit, or the like, where the communications interface is a collective name, and may include one or more interfaces. The storage unit 1001 may be a memory.

Figure 10B:
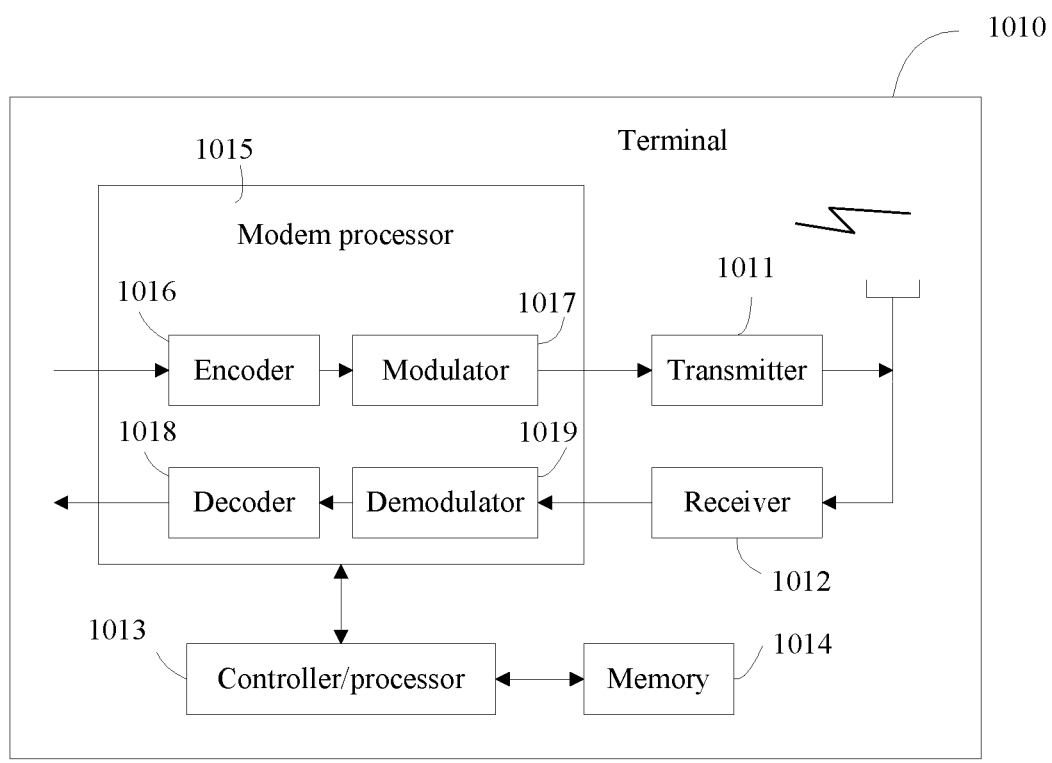
FIG. 10b is a schematic structural diagram of another terminal according to an embodiment of the present invention.

When the processing unit 1002 is a processor, the communications unit 1003 is a transceiver, and the storage unit 1001 is a memory, the terminal in the embodiments of the present invention may be a terminal shown in FIG. 10b.

FIG. 10b is a simplified schematic diagram of a possible design structure of a terminal according to an embodiment of the present invention. The terminal 1010 includes a transmitter 1011, a receiver 1012, and a processor 1013. The processor 1013 may alternatively be a controller, and is represented as "controller/processor 1013" in FIG. 10b. Optionally, the terminal 1010 may further include a modem processor 1015, where the modem processor 1015 may include an encoder 1016, a modulator 1017, a decoder 1018, and a demodulator 1019.

In an example, the transmitter 1011 adjusts (for example, performs analog conversion, filtering, amplification, and up-conversion on) an output sample and generates an uplink signal, and the uplink signal is transmitted to the AN in the foregoing embodiments through an antenna. On a downlink, the antenna receives a downlink signal transmitted by the AN in the foregoing embodiments. The receiver 1012 adjusts (for example, performs filtering, amplification, down-conversion, or digitalization on) a signal received from the antenna, and provides an input sample. In the modem processor 1015, the encoder 1016 receives service data and a signaling message that are to be sent on an uplink, and processes (for example, performs formatting, encoding, or interleaving on) the service data and the signaling message. The modulator 1017 further processes (for example, performs symbol mapping or modulation on) encoded service data and an encoded signaling message, and provides an output sample. The demodulator 1019 processes (for example, demodulates) the input sample and provides symbol estimation. The decoder 1018 processes (for example, performs de-interleaving or decoding on) the symbol estimation, and provides decoded data and a decoded signaling message that are sent to the terminal 1010. The encoder 1016, the modulator 1017, the demodulator 1019, and the decoder 1018 may be implemented by the integrated modem processor 1015. These units perform processing based on radio access technologies (for example, access technologies of an LTE system and another evolved system) used in a radio access network. It should be noted that when the terminal 1010 does not include the modem processor 1015, the foregoing function of the modem processor 1015 may alternatively be implemented by the processor 1013.

Further, the terminal 1010 may further include a memory 1014, where the memory 1014 is configured to store program code and data of the terminal 1010.

Methods or algorithm steps described in combination with the content disclosed in the embodiments of the present invention may be implemented by hardware, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Certainly, the storage medium may alternatively be a component of the processor. The processor and the storage medium may be located in an ASIC. Further, the ASIC may be located in the mobility management function entity, the session management function entity, or the terminal. Certainly, the processor and the storage medium may exist in the mobility management function entity, the session management function entity, or the terminal as discrete components.

A person skilled in the art should be aware that in the foregoing one or more examples, functions described in the embodiments of the present invention may be implemented by hardware, software, firmware, or any combination thereof. When the present invention is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on the technical solutions of the embodiments of the present invention shall fall within the protection scope of the embodiments of the present invention.

What is claimed is:

1. A session activation method, wherein the method comprises:
    obtaining, by a mobility management function entity, a protocol data unit (PDU) session activation request of a terminal, wherein the PDU session activation request comprises an identifier of a PDU session and an identifier of the terminal, and the PDU session activation request requests activation of the PDU session;
    selecting, by the mobility management function entity based on the identifier of the PDU session, the identifier of the terminal and a binding relationship, a session management function entity;
    sending, by the mobility management function entity, the PDU session activation request to the session management function entity;
    receiving, by the mobility management function entity, a handover request from a target access node, wherein the handover request carries the identifier of the terminal and an identifier of the target access node, and the handover request requests a handover of the terminal from a source access node to the target access node; and
    sending, by the mobility management function entity, a mobility event of the terminal to the session management function entity, wherein the mobility event comprises the identifier of the terminal and the identifier of the target access node, wherein the mobility event triggers the session management function entity to determine whether a context of an idle-state PDU session needs to be updated, wherein the idle-state PDU session stays in an idle state after the context of the idle-state PDU session is updated.

2. The method according to claim 1, wherein the obtaining, by a mobility management function entity, a PDU session activation request of a terminal comprises:
    receiving, by the mobility management function entity, the PDU session activation request from the terminal.

3. The method according to claim 1, wherein the binding relationship indicates the session management function entity corresponding to the identifier of the PDU session and the identifier of the terminal, and wherein the method further comprises:
    storing, by the mobility management function entity, the binding relationship.

4. The method according to claim 1, wherein the method further comprises:
    obtaining, by the mobility management function entity, a control plane connection activation request, wherein the control plane connection activation request requests activation of a control plane connection;
    sending, by the mobility management function entity, a control plane connection configuration message to an access network (AN), wherein the control plane connection configuration message carries a parameter used to configure the AN;
    receiving, by the mobility management function entity from the AN, a response for acknowledging that control plane connection configuration is completed;
    determining, by the mobility management function entity, the control plane connection is activated based on the response for acknowledging that control plane connection configuration is completed; and
    after determining the control plane connection is activated, performing the selecting, by the mobility management function entity based on the identifier of the PDU session, the identifier of the terminal and the binding relationship, the session management function entity.

5. A mobility management function entity, comprising:
    at least one processor; and
    a memory coupled to the at least one processor and having program instructions stored thereon which, when executed by the at least one processor, cause the mobility management function entity to perform operations comprising:
    obtaining a protocol data unit (PDU) session activation request of a terminal, wherein the PDU session activation request comprises an identifier of a PDU session and an identifier of the terminal, and the PDU session activation request requests activation of the PDU session;
    selecting, based on the identifier of the PDU session, the identifier of the terminal and a binding relationship, a session management function entity;
    sending the PDU session activation request to the session management function entity;
    receiving a handover request from a target access node, wherein the handover request carries the identifier of the terminal and an identifier of the target access node, and the handover request requests a handover of the terminal from a source access node to the target access node; and
    sending a mobility event of the terminal to the session management function entity, wherein the mobility event comprises the identifier of the terminal and the identifier of the target access node, wherein the mobility event triggers the session management function entity to determine whether a context of an idle-state PDU session needs to be updated, wherein the idle-state PDU session stays in an idle state after the context of the idle-state PDU session is updated.

6. The mobility management function entity according to claim 5, wherein obtaining the PDU session activation request of a terminal comprises:
receiving the PDU session activation request from the terminal.

7. The mobility management function entity according to claim 5, wherein the binding relationship indicates the session management function entity corresponding to the identifier of the PDU session and the identifier of the terminal, and wherein the operations further comprise:
storing the binding relationship.

8. The mobility management function entity according to claim 5, wherein the operations further comprise:
obtaining, by the mobility management function entity, a control plane connection activation request, wherein the control plane connection activation request requests activation of a control plane connection;
sending, by the mobility management function entity, a control plane connection configuration message to an access network (AN), wherein the control plane connection configuration message carries a parameter used to configure the AN;
receiving, by the mobility management function entity from the AN, a response for acknowledging that control plane connection configuration is completed;
determining, by the mobility management function entity, the control plane connection is activated based on the response for acknowledging that control plane connection configuration is completed; and
after determining the control plane connection is activated, performing the selecting, by the mobility management function entity based on the identifier of the PDU session, the identifier of the terminal and the binding relationship, the session management function entity.

9. A communications system, comprising a mobility management function entity and a session management function entity, wherein:
the mobility management function entity is configured to:
obtain a protocol data unit (PDU) session activation request of a terminal, wherein the PDU session activation request comprises an identifier of a PDU session and an identifier of the terminal, and the PDU session activation request requests activation of the PDU session;
select, based on the identifier of the PDU session, the identifier of the terminal and a binding relationship, a session management function entity identified by the identifier of the session management function entity;
send the PDU session activation request to the session management function entity;
receive a handover request from a target access node, wherein the handover request carries the identifier of the terminal and an identifier of the target access node, and the handover request requests a handover of the terminal from a source access node to the target access node; and
send a mobility event of the terminal to the session management function entity, wherein the mobility event comprises the identifier of the terminal and the identifier of the target access node, wherein the mobility event triggers the session management function entity to determine whether a context of an idle-state PDU session needs to be updated, wherein the idle-state PDU session stays in an idle state after the context of the idle-state PDU session is updated the session management function entity is configured to:
receive the PDU session activation request of a terminal from the mobility management function entity; and
activate the PDU session based on the PDU session activation request.

10. The communications system according to claim 9, wherein the mobility management function entity configured to obtain the PDU session activation request of a terminal comprise:
the mobility management function entity configured to receive the PDU session activation request from the terminal.

11. The communications system according to claim 9, wherein
the session management function entity is configured to:
receive the mobility event of the terminal from the mobility management function entity;
determine at least one PDU session corresponding to the identifier of the terminal; and
when the at least one PDU session comprises an idle-state PDU session, determine whether a context of the idle-state PDU session needs to be updated.

12. The communications system according to claim 11, wherein the context of the at least one PDU session comprises an identifier of a first user plane function entity; the mobility management function entity configured to determine whether a context of the idle-state PDU session needs to be updated comprise:
determine, based on a service area of the target access node and a service area list of the first user plane function entity, whether the context of the idle-state PDU session needs to be updated.

13. The communications system according to claim 12, wherein the mobility management function entity configured to determine, based on a service area of the target access node and a service area list of the first user plane function entity, whether the context of the idle-state PDU session needs to be updated comprise:
if the service area of the target access node is not in the service area list of the first user plane function entity, the mobility management function entity configured to determine that the context of the idle-state PDU session needs to be updated; or
if the service area of the target access node is in the service area list of the first user plane function entity, the mobility management function entity configured to determine that the context of the idle-state PDU session does not need to be updated.

14. The communications system according to claim 11, wherein the context of the idle-state PDU session comprises an identifier of a first user plane function entity, and the session management function entity is further configured to:
send a release message to the first user plane function entity in response to determining that the context of the idle-state PDU session needs to be updated, wherein the release message indicates the first user plane function entity to release a configuration resource of the idle-state PDU session; and
select a second user plane function entity for the terminal.

15. The communications system according to claim 9, wherein the mobility management function entity is further configured to:
- obtain a control plane connection activation request, wherein the control plane connection activation request requests activation of a control plane connection;
- send a control plane connection configuration message to an access network (AN), wherein the control plane connection configuration message carries a parameter used to configure the AN;
- receive, from the AN, a response for acknowledging that control plane connection configuration is completed;
- determine, the control plane connection is activated based on the response for acknowledging that control plane connection configuration is completed; and
- after determining the control plane connection is activated, perform the selecting, by the mobility management function entity based on the identifier of the PDU session, the identifier of the terminal and the binding relationship, the session management function entity.

16. A session activation method, wherein the method comprises:
- receiving, by a session management function entity, a protocol data unit (PDU) session activation request of a terminal from a mobility management function entity, wherein the PDU session activation request comprises an identifier of a PDU session and an identifier of the terminal, and the PDU session activation request requests activation of the PDU session, and the session management function entity is selected by the mobility management function entity based on the identifier of the PDU session, the identifier of the terminal and a binding relationship;
- activating, by the session management function entity, the PDU session based on the PDU session activation request;
- receiving, by the session management function entity, a mobility event of the terminal from the mobility management function entity, wherein the mobility event comprises the identifier of the terminal and an identifier of a target access node, and the target access node is an access node to which the terminal is to be handed over, wherein the mobility event triggers the session management function entity to determine whether a context of an idle-state PDU session needs to be updated;
- determining, by the session management function entity, at least one PDU session corresponding to the identifier of the terminal; and
- in response to determining that the at least one PDU session comprises an idle-state PDU session, determining, by the session management function entity, whether the context of the idle-state PDU session needs to be updated, wherein the idle-state PDU session stays in an idle state after the context of the idle-state PDU session is updated.

17. The method according to claim 16, wherein the context of the idle-state PDU session comprises an identifier of a first user plane function entity, and the method further comprises:
- sending, by the session management function entity, a release message to the first user plane function entity in response to determining that the context of the idle-state PDU session needs to be updated, wherein the release message indicates the first user plane function entity to release a configuration resource of the idle-state PDU session; and
- selecting, by the session management function entity, a second user plane function entity for the terminal.

18. The method according to claim 16, wherein the method further comprises:
- determining, by the session management function entity, whether the at least one PDU session corresponding to the identifier of the terminal comprises one or more of an active-state PDU session or an idle-state PDU session; and
- in response to determining that the at least one PDU session comprises at least one active-state PDU session, instructing, by the session management function entity, the terminal and the target access node to update a context of the at least one active-state PDU session.

19. A session management function entity, comprising:
- at least one processor; and
- a memory coupled to the at least one processor and having program instructions stored thereon which, when executed by the at least one processor, cause the session management function entity to perform operations comprising:
  - receiving a protocol data unit (PDU) session activation request of a terminal from a mobility management function entity, wherein the PDU session activation request comprises an identifier of a PDU session and an identifier of the terminal, and the PDU session activation request requests activation of the PDU session, and the session management function entity is selected by the mobility management function entity based on the identifier of the PDU session, the identifier of the terminal and a binding relationship;
  - activating the PDU session based on the PDU session activation request;
  - receiving a mobility event of the terminal from the mobility management function entity, wherein the mobility event comprises the identifier of the terminal and an identifier of a target access node, and the target access node is an access node to which the terminal is to be handed over, wherein the mobility event triggers the session management function entity to determine whether a context of an idle-state PDU session needs to be updated;
  - determining at least one PDU session corresponding to the identifier of the terminal; and
  - when the at least one PDU session comprises an idle-state PDU session, determining whether the context of the idle-state PDU session needs to be updated, wherein the idle-state PDU session stays in an idle state after the context of the idle-state PDU session is updated.

20. The session management function entity according to claim 19, wherein the operations further comprise:
- determining whether the at least one PDU session corresponding to the identifier of the terminal comprises one or more of an active-state PDU session or an idle-state PDU session; and
- in response to determining that the at least one PDU session comprises at least one active-state PDU session, instructing the terminal and the target access node to update a context of the at least one active-state PDU session.

* * * * *